US008609063B2

(12) United States Patent
Campbell et al.

(10) Patent No.: US 8,609,063 B2
(45) Date of Patent: Dec. 17, 2013

(54) METAL EXTRACTANT REAGENTS HAVING INCREASED RESISTANCE TO DEGRADATION

(71) Applicants: John Campbell, Lancashire (GB); Susan Owens, Manchester (GB); Matthew Soderstrom, Mesa, AZ (US); Troy Bednarski, Chandler, AZ (US); Gustavo Marin, Providencia Santiago (CL)

(72) Inventors: John Campbell, Lancashire (GB); Susan Owens, Manchester (GB); Matthew Soderstrom, Mesa, AZ (US); Troy Bednarski, Chandler, AZ (US); Gustavo Marin, Providencia Santiago (CL)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 13/675,206

(22) Filed: Nov. 13, 2012

(65) Prior Publication Data

US 2013/0069008 A1    Mar. 21, 2013

Related U.S. Application Data

(62) Division of application No. 12/575,580, filed on Oct. 8, 2009, now Pat. No. 8,329,124.

(60) Provisional application No. 61/105,252, filed on Oct. 14, 2008.

(51) Int. Cl.
 *C22B 3/00* (2006.01)

(52) U.S. Cl.
 USPC ................................................ 423/658.5

(58) Field of Classification Search
 USPC ............................... 423/658.5; 252/184
 See application file for complete search history.

(56) References Cited

U.S. PATENT DOCUMENTS

| 3,817,745 | A | 6/1974 | Copes et al. | |
| 4,701,311 | A | 10/1987 | Baradel et al. | |
| 6,432,167 | B1 | 8/2002 | Virnig et al. | 75/721 |
| 6,596,053 | B2 | 7/2003 | Virnig et al. | 75/740 |
| 6,702,872 | B1 | 3/2004 | Virnig et al. | 75/711 |
| 7,309,474 | B2 | 12/2007 | Soderstrom | |
| 2006/0222580 | A1 | 10/2006 | Tinkler et al. | |

FOREIGN PATENT DOCUMENTS

WO    WO01/14604 A1    3/2001

OTHER PUBLICATIONS

G. Hurtado-Guzmán et al., "Oxime Degradation Chemistry in Copper Solvent Extraction Plants," Copper 2003-Cobre 2003, vol. VI-Hydrometallurgy of Copper (Book 2), pp. 719-734.
International Preliminary Report on Patentability of PCT/US2009/056966 with Written Opinion, date of mailing Apr. 28, 2011.

*Primary Examiner* — Steven Bos
(74) *Attorney, Agent, or Firm* — Charles E. Bell

(57) ABSTRACT

Solvent extraction compositions having an orthohydroxyaryloxime extractant, an anti-degradation agent, and a water-immiscible organic solvent, processes for extracting a metal from an aqueous acidic solution using same, and methods of reducing degradation of such compositions are provided herein.

15 Claims, No Drawings

METAL EXTRACTANT REAGENTS HAVING INCREASED RESISTANCE TO DEGRADATION

CROSS-REFERENCE TO RELATED APPLICATIONS

This application is a divisional of U.S. application Ser. No. 12/575,580, filed Oct. 8, 2009 (allowed), which claims benefit of priority to U.S. Provisional Application No. 61/105,252, filed Oct. 14, 2008 the contents of each of which is incorporated herein by reference in its entirety.

FIELD OF THE INVENTION

This invention relates to compositions of organic soluble anti-degradation agents and oxime extractants for use in the solvent extraction of metals from nitrate containing feeds. More specifically, the compositions in accordance with the invention are resistant to nitration and hydrolysis when used in the presence of these nitrate containing feeds.

BACKGROUND OF THE INVENTION

Solvent extractants are well known for the recovery of metals, especially copper, from aqueous streams and include oxime reagents, particularly o-hydroxyarylaldoximes and o-hydroxyarlyketoximes. While such reagents have been found to work well in the recovery of copper from solution, one problem that has been encountered in the application of such reagents is that the aldoxime and ketoxime reagents which are in continual use in metal extraction circuits can be degraded and the level of degradation can impair the efficiency of metal transfer from leach solution to strip solution. In particular it has been noted that this problem is more pronounced when metal values are extracted from certain ores. In Chile there are large mineral deposits of what are referred to as porphyry copper deposits. Normally such deposits do not contain high nitrate concentrations, but in very few parts of the world the deposits may contain large amounts of nitrate. Of particular note are the copper deposits in the Atacama Desert region of northern Chile, where mineralogy of the region gives rise to nitratine or Chile saltpetre ($NaNO_3$), a mineral with high solubility as well as nitre ($KNO_3$). These ores have been found to cause problems in the solvent extraction process especially with the degradation of solvent extraction reagents.

In recent years a number of articles and patents have appeared which have offered ways to reduce the rate of degradation of oximes in contact with nitrate containing feeds. Many of these involved operational adjustments to the pregnant leach solutions (PLS). These included reducing the nitrate concentration, raising the pH, controlling the redox potential of the feed, and reducing the transfer of impurities from the leach solution to the electrolyte. Given the high flow rates of the PLS in the solvent extraction processes, combining one or more of these adjustments into a extraction circuit flow sheet is not a trivial matter. Addition of nitrous acid quenchers such as sulphamic acid or urea to the circulating electrolyte is shown to be an effective protection for the oximes if nitrate ions are transferred from the leach to electrolyte solution. Another way to address the problem was to use a reagent based on 2-hydroxy-5-alkyl-acetophenone oxime (ketoxime) which has been reported to show increased stability to that of salicylaldoximes in contact with aqueous streams of this type. Ketoxime formulations do contain a higher concentration of residual nonyl phenol carried through from their manufacture and, as shown in this application for patent, this residual phenol could, in part, be responsible for their increased stability over that of salicylaldoximes. Ketoximes are weaker reagents than salicylaldoximes so in using these o-hydroxyarylketoximes the copper extraction could be limited when moving to higher tenor or lower pH feeds. Providing a strong oxime formulation that is stable to these aggressive aqueous feeds would negate the need for costly adjustments to the PLS whilst enabling the maximium copper recovery from high copper/low pH solutions.

Reagent formulations which could resist this enhanced degradation in contact with these streams or similar conditions would be advancement on existing technology.

SUMMARY OF THE INVENTION

The use of organic soluble anti-degradation agents in formulation with modified or unmodified salicylaldoxime and/or ketoxime extractants to reduce the rate of nitration and hydrolysis of the oximes during both the extraction and stripping of copper from the organic phase when contacted with nitrate containing streams.

DETAILED DESCRIPTION OF CERTAIN EMBODIMENTS OF THE INVENTION

The present invention concerns a solvent extraction composition, a solvent extraction process and especially a process for the extraction of metals, particularly copper from aqueous solutions, especially solutions obtained by leaching ores.

It is known to extract metals, especially copper from aqueous solutions containing the metals in the form of, for example, salts, by contacting the aqueous solution with a solution of a solvent extractant in a water immiscible organic solvent and then separating the solvent phase loaded with the metals, i.e. containing at least a part of the metals in the form of a complex. The metals can then be recovered by stripping with a solution of lower pH (the electrolyte) followed for example, by electrowinning. Most commonly, the aqueous metal-containing solutions for extraction are the result of the acid leaching of ores.

Solvent extractants which have found favour in recent years particularly for the recovery of copper from aqueous solutions include oxime reagents, especially o-hydroxyaryl-laldoximes and o-hydroxyarylketoximes. While such reagents have been found to work well in the recovery of copper from solutions, one problem that has been encountered in the application of such reagents is that the aldoxime and ketoxime reagents which are in continual use can be degraded and the level of degradation can be such that the efficiency of metal transfer from leach solution to strip solution can be impaired. In particular it has been noted that this problem is more pronounced when metal values are extracted from certain ores. In Chile there are large deposits of what are referred to as porphyry copper deposits. Normally deposits do not contain high nitrate concentrations, but in very few parts of the world the deposits may contain large amounts of nitrate. Of particular note are the copper deposits in the Atacama Desert region of northern Chile, where mineralogy of the region gives rise to nitratine or Chile saltpetre (NaNO3), a mineral with high solubility as well as nitre (KNO3). These ores have been found to cause problems in the solvent extraction process especially with the degradation of solvent extraction reagents. Reagent formulations which could resist this enhanced degradation when in contact with these streams or similar conditions would be an advancement on existing technology.

According to a first aspect of the present invention, there is provided a solvent extraction composition comprising one or more orthohydroxyarylaldoximes and/or one or more orthohydroxyarylketoximes, and/or one or more equilibrium modifiers and one or more anti-degradation agent present (as a percentage of the in-use formulation) from about 0.1-20%, preferably 0.5-10%. The compositions preferably also comprise a water immiscible organic solvent.

Compositions according to the present invention may facilitate reduced oxime degradation in solvent extraction circuits in contact with metal aqueous feeds containing nitrate ions.

The orthohydroxyarylketoxime compounds employed in the present invention are substantially water insoluble and preferably have the formula:

Formula (1)

wherein
$R^1$ is an optionally substituted hydrocarbyl group
$R^2$ is an optionally substituted ortho-hydroxyaryl group, and salts thereof.

The orthohydroxyarylaldoxime compounds employed in the present invention are substantially water insoluble and preferably have the formula:

Formula (2)

wherein
$R^3$ is an optionally substituted ortho-hydroxyaryl group, and salts thereof.

While the invention is described herein with reference to compounds of Formula (1) and (2), it is understood that it relates to said compound in any possible tautomeric forms, and also the complexes formed between orthohydroxyarylaldoximes or orthohydroxyarylketoximes and metals, particularly copper.

Optionally substituted hydrocarbyl groups which may be represented by $R^1$ preferably comprise optionally substituted alkyl and aryl groups including combinations of these, such as optionally substituted aralkyl and alkaryl groups.

Examples of optionally substituted alkyl groups which may be represented by $R^1$ include groups in which the alkyl moieties can contain from 1 to 20, especially from 1 to 4, carbon atoms. A preferred orthohydroxyarylketoxime is one in which $R^1$ is alkyl, preferably containing up to 20, and especially up to 10, and more preferably up to 3 saturated aliphatic carbon atoms, and most preferably $R^1$ is a methyl group.

Examples of optionally substituted aryl groups which may be represented by $R^1$ include optionally substituted phenyl groups. When $R^1$ is an aryl group, it is preferably an unsubstituted phenyl group.

The orthohydroxyarylaldoximes and orthohydroxyarylketoximes are often present in a total amount of up to 70% by weight of the composition, commonly no more than 60%, and usually no more than 50% w/w. Often, the total amount of orthohydroxyarylaldoxime and orthohydroxyarylketoxime in use comprises at least 1% by weight, commonly at least 2.5% by weight and usually at least 5% by weight of composition, and preferably comprises from 7.5 to 20%, such as about 10%, by weight of the composition.

Equilibrium modifiers employed in the present invention are substantially water insoluble. Suitable equilibrium modifiers can be alkylphenols, alcohols, esters, ethers and polyethers, carbonates, ketones, nitriles, amides, carbamates, sulphoxides, and salts of amines and quaternary ammonium compounds and mixtures thereof.

Anti-degradation agents useful in the present invention should have no detrimental effect on the copper solvent extraction process. More specifically, the anti-degradation agent should not interfere with copper transfer; it should be selective over other metals likely to be present in significant concentration in the leach solution; it should not have a detrimental effect on kinetic performance; it should not have a detrimental effect on stability of the extractant, and it should not be detrimental to the physical performance of the organic phase. The anti-degradation agents employed in the present invention are substantially water insoluble.

Examples of suitable chemistries include all phenols containing one or more OH groups, resorcinols catechols, naphthols and mixtures thereof. The ortho and/or para position relative to the hydroxy group should be free from substitution to allow nitration. Compounds should include a solubilising group to ensure diluent solubility (e.g. optionally substituted hydrocarbyl groups which may preferably comprise optionally substituted alkyl and aryl groups including combinations of these, such as optionally substituted aralkyl and alkaryl groups having from 6 to about 20 carbons).

Organic solvents which may be present in the composition include any mobile organic solvent, or mixture of solvents, which is immiscible with water and is inert under the extraction conditions to the other materials present. Preferably the organic solvent has a low aromatic hydrocarbon content.

Preferred organic solvents are hydrocarbon solvents which include aliphatic, alicyclic and aromatic hydrocarbons and mixtures thereof as well as chlorinated hydrocarbons such as trichloroethylene, perchloroethylene, trichloroethane and chloroform.

Highly preferred organic solvents having a low aromatic content include solvents and solvent mixtures where the amount of aromatic hydrocarbons present in the organic solvent is less than 30%, usually less than 23%, often less than 5%, and frequently less than 1%.

Examples of suitable hydrocarbon solvents include ESCAID™ 110, ESCAID™ 115, ESCAID™ 120, ESCAID™ 200, and ESCAID™ 300 commercially available from Exxon, Houston Tex., SHELLSOL™ D70 and D80 300 commercially available from Shell Oil, Houston, Tex., and CONOCO™ 170 commercially available from Conoco, Ogden, Utah. Suitable solvents are hydrocarbon solvents that include high flash point solvents and solvents with a high aromatic content such as SOLVESSO™ 150 commercially available from Exxon.

More preferred are solvents with a low aromatic content. Certain suitable solvents with a low aromatic content, have aromatic contents of <1% w/w, for example, hydrocarbon solvents such as ESCAID™ 110 commercially available from Exxon, and ORFOM™ SX 10 and ORFOM™ SX11 commercially available from Phillips Petroleum, Bartlesville, Okla. Especially preferred, however, on grounds of low toxicity and wide availability, are hydrocarbon solvents of relatively low aromatic content such as kerosene, for example ESCAID™ 100 which is a petroleum distillate with a total aromatic content of 23% commercially available from Exxon, or ORFOM™ 5X7, commercially available from Phillips Petroleum.

In many embodiments, the composition comprises at least 30%, often at least 45% by weight, preferably from 50 to 95% w/w of water-immiscible hydrocarbon solvent.

Advantageously, it may be preferred to make and supply the composition in the form of a concentrate. The concentrate may then be diluted by the addition of organic solvents as described herein above to produce compositions in the ranges as described herein above. Where the concentrate contains a solvent, it is preferred that the same solvent is used to dilute the concentrate to the "in use" concentration range. In many embodiments, the concentrate composition comprises up to 30%, often up to 20% by weight, preferably up to 10% w/w of water-immiscible hydrocarbon solvent. Often the concentrate composition comprises greater than 5% w/w of water-immiscible hydrocarbon solvent. In certain high strength concentrates it may be necessary to employ a higher than normal aromatic hydrocarbon content. In such cases where a high aromatic hydrocarbon containing solvent is used in the concentrate, solvent of very low aromatic hydrocarbon content may be used to dilute the concentrate to the "in use" concentration range.

According to a second aspect of the present invention, there is provided a process for the extraction of a metal from solution in which an acidic solution containing a dissolved metal is contacted with a solvent extraction composition, whereby at least a fraction of the metal is extracted into the organic solution, characterised in that the solvent extraction composition comprises a water immiscible organic solvent, one or more modified or unmodified orthohydroxyarylaldoximes and one or more modified or unmodified orthohydroxyarylketoximes, and an anti-degradation agent present (as a percentage of the in-use formulation) from about 0.1-20% but preferably 0.5-10%.

Metals that may be extracted in the process according to the second aspect of the present invention include copper, iron, cobalt, nickel, manganese and zinc, most preferably copper.

The orthohydroxyarylaldoximes, orthohydroxyarylketoximes, the equilibrium modifiers, the anti-degradation agent and the water immiscible organic solvent are as herein described before.

The aqueous acidic solution from which metals are extracted by the process of the second aspect of the present invention often has a pH in the range of from −1 to 7, preferably from 0 to 5, and most preferably from 0.25 to 3.5. The solution can be derived from the leaching of ores or may be obtained from other sources, for example metal containing waste streams.

The concentration of metal, particularly copper, in the aqueous acidic solution will vary widely depending for example on the source of the solution. Where the solution is derived from the leaching of ores, the metal concentration is often up to 75 g/l and most often from 1 to 40 g/l.

Preferred solvent extraction compositions are those which comprise one of the following:

1) A blend of 5-($C_8$ to $C_{14}$ alkyl)-2-hydroxybenzaldoxime and 5-($C_8$ to $C_{14}$ alkyl)-2-hydroxyacetophenone oxime in a weight ratio of from about 90:10 to about 50:50 aldoxime to ketoxime, and/or one or more modifiers selected from 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, butyl adipate, pentyl adipate, hexyl adipate, isobutyl heptyl ketone, nonanone, diundecyl ketone, 5,8-diethyldodecane-6,7-dione, tridecanol, and nonyl phenol, and an anti-degradation agent selected from those set forth herein above, present (as a percentage of the in-use formulation) from about 0.1-20% but preferably 0.5-10%.

2) A blend of 5-($C_8$ to $C_{14}$ alkyl)-2-hydroxybenzaldoxime or 5-($C_8$ to $C_{14}$ alkyl)-2-hydroxyacetophenone oxime, one or more modifiers selected from 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, butyl adipate, pentyl adipate, hexyl adipate, isobutyl heptyl ketone, nonanone, diundecyl ketone, 5,8-diethyldodecane-6,7-dione, tridecanol, and nonyl phenol, and an anti-degradation agent selected from those set forth herein above, present (as a percentage of the in-use formulation) from about 0.1-20%, but preferably from about 0.5-10%.

The process of the second aspect of the present invention can be carried out by contacting the solvent extractant composition with the aqueous acidic solution. Ambient or elevated temperatures, such as up to 75° C. can be employed if desired. Often a temperature in the range of from 5 to 60° C., and preferably from 15 to 40° C., is employed. The aqueous solution and the solvent extractant are usually agitated together to maximize the interfacial areas between the two solutions. The volume ratio of solvent extractant to aqueous solution are commonly in the range of from 20:1 to 1:20, and preferably in the range of from 5:1 to 1:5. In many embodiments, to reduce plant size and to maximize the use of solvent extractant, organic to aqueous volume ratios close to 1:1 are maintained by recycle of one of the streams.

After contact with the aqueous acidic solution, the metal can be recovered from the solvent extractant by contact with an aqueous acidic strip solution.

The aqueous strip solution employed in the process according to the second aspect of the present invention is usually acidic, commonly having a pH of 2 or less, and preferably a pH of 1 or less, for example, a pH in the range of from −1 to 0.5. The strip solution commonly comprises a mineral acid, particularly sulphuric acid, nitric acid or hydrochloric acid. In many embodiments, acid concentrations, particularly for sulphuric acid, in the range of from 130 to 200 g/l and preferably from 150 to 180 g/l are employed. When the extracted metal is copper, preferred strip solutions comprise stripped or spent electrolyte from a copper electro-winning cell, typically comprising up to 80 g/l copper, often greater than 20 g/l copper and preferably from 30 to 70 g/l copper, and up to 220 g/l sulphuric acid, often greater than 120 g/l sulphuric acid, and preferably from 150 to 180 g/l sulphuric acid.

The volume ratio of organic solution to aqueous strip solution in the process of the second aspect of the present invention is commonly selected to be such so as to achieve transfer, per liter of strip solution, of up to 50 g/l of metal, especially copper into the strip solution from the organic solution. In many industrial copper electrowinning processes transfer is often from 10 g/l to 35 g/l, and preferably from 15 to 20 g/l of copper per liter of strip solution is transferred from the organic solution. Volume ratios of organic solution to aqueous solution of from 1:2 to 15:1 and preferably from 1:1 to 10:1, especially less than 6:1 are commonly employed.

Both the separation and stripping process can be carried out by a conventional batch extraction technique or column contactors or by a continuous mixer settler technique. The latter technique is generally preferred as it recycles the stripped organic phase in a continuous manner, thus allowing the one volume of organic reagent to be repeatedly used for metal recovery.

A preferred embodiment of the second aspect of the present invention comprises a process for the extraction of a metal from aqueous acidic solution in which:

in step 1, the solvent extraction composition comprising a water immiscible organic solvent, one or more orthohydroxyarylaldoximes and/or one or more orthohydroxyarylketoximes, and one or more equilibrium modifiers and an anti-degradation agent is first contacted with the aqueous acidic solution containing metal, in step 2, separating the solvent extraction composition containing metal-solvent extractant complex from the aqueous acidic solution;

in step 3, contacting the solvent extraction composition containing metal-solvent extractant complex with an aqueous acidic strip solution to effect the stripping of the metal from the water immiscible phase;

in step 4, separating the metal-depleted solvent extraction composition from the loaded aqueous strip solution.

The invention will be illustrated but not limited by the following examples.

EXAMPLES

A screen to evaluate whether anti-degradation additives are effective in scavenging nitrating species in two phase systems is designed. A surface active phenol (p-tertamylphenol, TAP) is incorporated into an organic phase and then this organic phase is contacted with a pregnant leach solution (PLS) containing various cations and anions (including nitrate), the level of nitrated phenol measured after contact gives a "nitration potential" for a given PLS composition. In addition to measuring the nitration potential for a pregnant leach solution, this screen (TAP test) can be used as a measure to indicate nitration potential in minesite PLS feeds.

Addition of a water immiscible anti-degradation agent to the organic phase in addition to the TAP followed by contacting the organic phase with a nitrate containing PLS, gives an indication of the ability of the agent to scavenge nitrating species in competition to the highly reactive TAP. Anti-degradation agents with the ability to scavenge nitrating species under these conditions should protect the less reactive salicylaldoximes/ketoximes from nitration under these conditions.

TAP Screen

A solution of TAP (0.0002M) with/without anti-degradation agent (0.004M) in heptane (5 ml) is stirred in contact with a nitrate containing PLS (50 ml) for 3 hours at 35° C. The organic phase is separated and the level of nitrated TAP determined by GC. All tests are run in duplicate.

PLS composition:
Copper 7 g/l
Ferric 5 g/l
Nitrate 45 g/l
Chloride 10 g/l
pH 1.2

TABLE 1

| Test | Duplicate | Anti-degradation agent | Nitrated TAP Area % | Nitrated TAP Average % |
|---|---|---|---|---|
| Control | 1 | None | 79.05 | 78.1 |
|  | 2 | None | 77.2 |  |
| A | 1 | 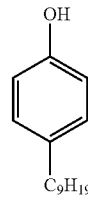 | 51.89 | 51.1 |
|  | 2 |  | 50.34 |  |
| B | 1 | 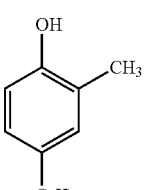 | 55.3 | 53.5 |
|  | 2 |  | 51.69 |  |
| C | 1 | 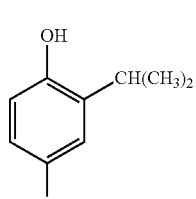 | 69.2 | 68.9 |
|  | 2 |  | 68.6 |  |
| D | 1 | 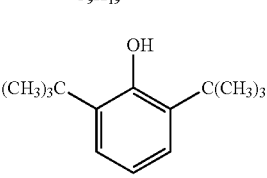 | 60.2 | 60.9 |
|  | 2 |  | 61.7 |  |

TABLE 1-continued

| Test | Duplicate | Anti-degradation agent | Nitrated TAP Area % | Nitrated TAP Average % |
|---|---|---|---|---|
| E | 1<br>2 | 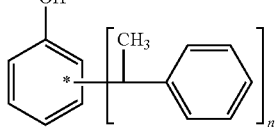<br>n = 1, 2 or 3 | 42.8<br>42.0 | 42.4 |
| F | 1<br>2 | 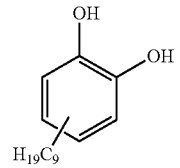 | 0<br>0 | 0 |
| G | 1<br>2 | 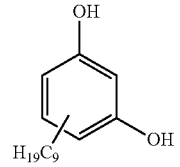 | 0<br>0 | 0 |
| H | 1<br>2 | 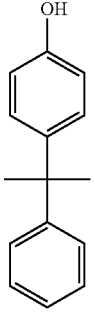 | 4.4<br>5.9 | 5.1 |

Conclusion

In all cases the presence of the water immiscible anti-degradation agent in the organic phase showed the ability to scavenge nitrating species whilst in the presence of the highly reactive tert-amyl phenol.

Protection of Oximes in Contact with High Nitrate Feed

To confirm the protective nature of these anti-degradation agents on commercial oximes the following experiments are completed. To show the activity of these compounds an anti-degradation agent showing average activity from the TAP screen is chosen to exemplify the effect. Reagent used: mixed isomers of (1-Phenylethyl) phenol, (Table 1, test E).

Example 1

An aqueous pregnant leach solution (400 ml) having a pH of 2.0 is prepared containing Cu 6 g/l, ferric iron 3 g/l, chloride 10 g/l and nitrate 60 g/l. A kerosene (ORFOM™ SX11) solution (400 ml) containing a mixture of 23.6 g 5-nonylsalicyladloxime and 19 g Kodaflex TXIB is also prepared. The above acid leach solution and the kerosene solution are placed in a reaction flask fitted with stirrer and a condenser. The temperature is maintained at 40±2° C. with the use of an external heating bath. The solutions are mixed at 600 rpm with the continuity of the phases being aqueous continuous. Samples of the organic are extracted at various time intervals and as the nitrated oxime will not allow the copper to be stripped from the organic a minimum strip value for the organic phase is calculated (Organic phase stripped with 2 contacts of a 15% sulfuric acid at a 1:5 O/A ratio). If the degree of nitration becomes severe, a precipitate forms in the organic phase.

As hydrolytic degradation of the oximes also appears during nitration, a maximum load of the organic phase is also calculated.

Results are presented in Table 2

Example 2

The process of Example 1 is repeated except that 24.8 g/l 2-hydroxy-5-nonylacetophenone oxime is present in the kerosene phase in place of the salicylaldoxime formulation.
Results are presented in Table 2

Example 3

The process of Example 1 is repeated except that 7.38 g/l (1-Phenylethyl) phenol (mixed isomer) is present in the kerosene phase in addition to a mixture of 23.6 g 5-nonylsalicyladloxime and 19 g Kodaflex TXIB.
Results are presented in Table 2

Example 4

The process of Example 1 is repeated except that 14.76 g/l (1-Phenylethyl) phenol (mixed isomer) is present in the kerosene phase in addition to a mixture of 23.6 g 5-nonylsalicyladloxime and 19 g Kodaflex TXIB.

Results are presented in Table 2

TABLE 2

| | Minimum Strip vaue (Cu ppm) | | | |
|---|---|---|---|---|
| Time at 40° C. | Example 1 Salicylaldoxime formulation | Example 2 Hydroxyacetophenone oxime (Ketoxime) | Example 3 Salicylaldoxime formulation + anti-degradation agent (~1.8%) | Example 4 Salicylaldoxime formulation + anti-degradation agent (~3.7%) |
| 0 | 0 | 0 | 0 | 0 |
| 170 | Precipitated* | 0.48 | 0.27 | 0.34 |
| 336 | | 120 | 0.32 | 0.35 |
| 502 | | 522 | 0.43 | 0.44 |
| 619 | | 663 | 0.32 | 0.28 |
| Max Load @ 0 hours | 6.78 | 6.71 | 6.78 | 6.73 |
| Max Load @ 619 hours | 2.70 | 5.53 | 6.47 | 6.49 |

*nitration at such a level that the nitrated copper complex precipitated

Conclusion

Addition of the anti-degradation agent to the salicylaldoxime significantly increased the stability of the oxime to both nitration and hydrolysis as compared to both the unstabilized salicylaldoxime formulation and the commercially favoured ketoxime.

Application Tests

Apart from stabilizing oximes in contact with nitrate containing feeds, any additive must not produce detrimental effects on the metallurgical performance of the commercial reagent. The following tests carried out using the Acorga Extraction Reagents: Standard Test Methods compared the metallurgical performance of the formulations in examples 1-4, before and after the degradation test.

(i) Extraction kinetics
(ii) Cu:Fe selectivity
(iii) Phase disengagement

| Test | Salicylaldoxime formulation | Hydroxyacetophenone oxime (Ketoxime) | Salicylaldoxime formulation + anti-degradation agent (~10%) | Salicylaldoxime formulation + anti-degradation agent (~20%) |
|---|---|---|---|---|
| Extraction Kinetics (% ATE) | | | | |
| At 0 hours | 98.6 | 92.1 | 99.6 | 98.8 |
| At 619 hours | precipitate | 85.9 | 91.1 | 96.2 |
| Cu:Fe Selectivity | | | | |
| At 0 hours | 4990:1 | 2237:1 | 3831:1 | 3414:1 |
| At 619 hours | precipitate | 1023:1 | 1653:1 | 1865:1 |
| Phase disengagement (seconds) (organic cont) | | | | |
| At 0 hours | 27 | 116 | 27 | 34 |
| At 619 hours | precipitate | 3039 | 139 | 229 |

CONCLUSION

It can be seen that the metallurgical properties of the commercial formulations not containing the anti-degradation agent are significantly affected compared with that of the formulations containing the anti-degradation agent.

What is claimed is:

1. A method of reducing degradation of a hydrometallurgical solvent extraction composition comprising an orthohydroxyaryloxime compound, or salts, tautomers or metal complexes thereof, the method comprising:
   adding to the solvent extraction composition, and/or a solvent extraction circuit containing said solvent extraction composition, an anti-degradation agent chosen from a member selected from the group consisting of:
   i) a phenol compound substituted with a member selected from the group consisting of 2 t-butyl groups; from 1 to 2 t-butyl groups and a $C_1$-$C_4$ alkyl group; from 1 to 3 alkaryl groups; and a cumyl group;
   ii) a catechol compound substituted with a solubilizing group chosen from a member selected from the group consisting of an optionally substituted $C_6$-$C_{20}$ alkyl; and an optionally substituted $C_6$-$C_{20}$ aryl;
   iii) a resorcinol compound substituted with a solubilizing group chosen from a member selected from the group consisting of an optionally substituted $C_6$-$C_{20}$ alkyl; and an optionally substituted $C_6$-$C_{20}$ aryl; and
   iv) mixtures of (i)-(iii),
thereby stabilizing the orthohydroxyaryloxime compound or salts, tautomers or metal complexes thereof, and reducing degradation of the solvent extraction composition.

2. A method according to claim 1, wherein the orthohydroxyaryloxime compound is chosen from a member selected from the group consisting of a 5-($C_8$ to $C_{14}$ alkyl)-2-hydroxyacetophenone oxime; a 5-($C_8$ to $C_{14}$ alkyl)-2-hydroxybenzaldoxime; and mixtures thereof.

3. A method according to claim 2, wherein the orthohydroxyaryloxime compound is a mixture of aldoxime and ketoxime, and wherein the weight ratio of aldoxime:ketoxime is from 90:10 to 50:50.

4. A method according to claim 1, wherein the anti-degradation agent is chosen from a compound selected from the group consisting of

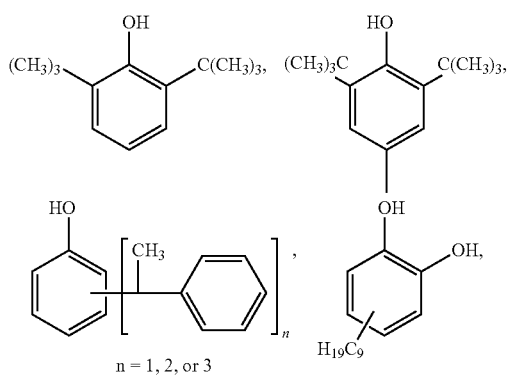

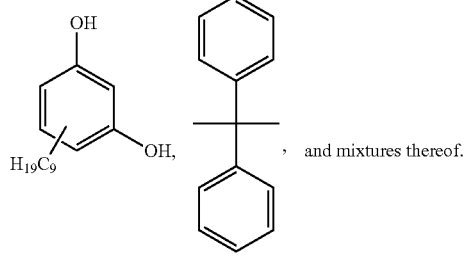

5. A method according to claim 4, wherein the anti-degradation agent is chosen from a member selected from the group consisting of mono-, di-, or tri-(1-phenylethyl)phenol; and mixtures thereof.

6. A method according to claim 1, wherein the anti-degradation agent is present in an amount from 0.1% to 20% by weight of the total weight of the solvent extraction composition.

7. A method according to claim 6, wherein the anti-degradation agent is present in an amount from 0.5% to 10% by weight of the total weight of the solvent extraction composition.

8. A method according to claim 1, wherein the solvent extraction composition further comprises an equilibrium modifier.

9. A method according to claim 8, wherein the equilibrium modifier is chosen from one or more compounds selected from the group consisting of 2,2,4-trimethyl-1,3-pentanediol mono-isobutyrate; 2,2,4-trimethyl-1,3-pentanediol mono-benzoate; 2,2,4-trimethyl-1,3-pentanediol di-isobutyrate; 2,2,4-trimethyl-1,3-pentanediol di-benzoate; butyl adipate; pentyl adipate; hexyl adipate; isobutyl heptyl ketone; nonanone; diundecyl ketone; 5,8-diethyldodecane-6,7-dione; tridecanol; and nonyl phenol.

10. A method according to claim 2, wherein the orthohydroxyaryloxime is present in an amount from 5% to 50% by weight of the total weight of the solvent extraction composition.

11. A method according to claim 10, wherein the anti-degradation agent is chosen from a member selected from the group consisting of mono-, di-, or tri-(1-phenylethyl)phenol; and mixtures thereof.

12. A method according to claim 11, wherein the anti-degradation agent is present in an amount from 0.1% to 20% by weight of the total weight of the solvent extraction composition.

13. A method according to claim 3, wherein the orthohydroxyaryloxime is present in an amount from 5% to 50% by weight of the total weight of the solvent extraction composition.

14. A method according to claim 13, wherein the anti-degradation agent is chosen from a member selected from the group consisting of mono-, di-, or tri-(1-phenylethyl)phenol; and mixtures thereof.

15. A method according to claim 14, wherein the anti-degradation agent is present in an amount from 0.1% to 20% by weight of the total weight of the solvent extraction composition.

* * * * *